Sept. 3, 1968    P. A. ENBLOM    3,399,639
LIQUID DISPENSER
Filed Sept. 28, 1966

INVENTOR.
PAUL A. ENBLOM
BY

ATTORNEY

United States Patent Office 3,399,639
Patented Sept. 3, 1968

3,399,639
LIQUID DISPENSER
Paul A. Enblom, Eden Prairie, Minn., assignor to Judd Ringer Corporation, St. Louis Park, Minn., a corporation of Minnesota
Filed Sept. 28, 1966, Ser. No. 582,628
9 Claims. (Cl. 111—7.4)

ABSTRACT OF THE DISCLOSURE

A dispenser for forcibly ejecting liquids, such as plant foods into or upon the soil. The dispenser has a tubular member which serves as a combination liquid reservoir and handle and has in its lower end a pump assembly including a piston and pressure chamber arrangement, the upper end of the pressure chamber opening into the lower end of the reservoir. The piston is fastened to the upper end of a tubular probe which projects through the lower end of the pump assembly and which includes inlet and discharge ports arranged so that liquid may be dispensed from the pump assembly out through the probe. When the probe is forced against the soil, the pump assembly is moved against the action of a biasing spring to admit a predetermined, measured volume of liquid from the reservoir around the piston into the pressure chamber. Thereafter when the downward force on the dispenser is released, the pump assembly is returned to the position to which it is biased and the relative movement between the piston and pressure chamber forcibly ejects the measured volume of liquid out of the pressure chamber through the probe.

---

Figure 1:
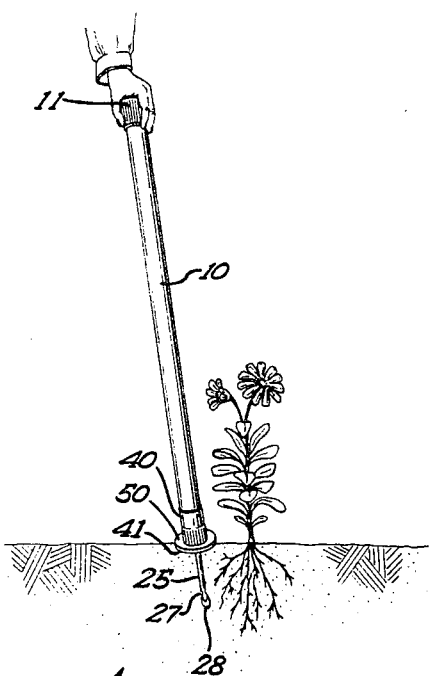

The present invention relates to a liquid dispenser of the type in which a liquid pump, secured to the lower end of a liquid reservoir, is actuated to discharge fluid with respect to the ground when the pump is actuated by a ground engaging member. The dispenser herein disclosed as one embodiment of the invention is an injector-type dispenser in which a tubular member is designed to be inserted beneath the soil surface in proximity to the roots of a plant to which the liquid is to be administered. It has previously been proposed to provide a liquid dispenser for dispensing liquid, such as weed exterminators or plant fertilizers, into or upon the soil, whereby the liquid is contained in an elongated liquid reservoir to the bottom of which is secured a pump assembly adapted to discharge liquid from the lower end of the reservoir. It has also previously been proposed to discharge the liquid from one or more openings in a sub-surface probe. In use, when it is desired to inject a liquid into the soil surrounding the roots of a plant to either fertilize the plant, or if it is an obnoxious plant, to administer an exterminator or poison to it, the probe is inserted into the ground near the plant and the pump is then actuated to discharge the liquid into the soil. In many of the devices previously proposed, it is necessary to support the device with one hand and operate a reciprocating plunger with the other hand. In other previous injector-type dispensers, a valve means is actuated upon engagement of the ground engaging member with the ground whereby the liquid is permitted to flow freely until the valve is again closed. In the operating of such a device, the amount of liquid administered to the plant is not uniform since it depends upon the length of time for which the valve means is held in the open position. Moreover, it is often desirable to provide a forcible ejection of the fluid with respect to the soil, and where fluid is to be injected below the surface, a forcible ejection is especially necessary to adequately dispense the liquid into the soil in proximity to the plant roots.

The primary disadvantage of the liquid dispensers which have previously been proposed is that these devices have been relatively complex and consequently relatively expensive to manufacture. Moreover, such complex liquid dispensing devices have previously embodied relatively intricate valve mechanisms which are susceptible to damage by corrosion and by the entrance of soil into the pump mechanism. The present invention provides a relatively simple and lightweight liquid dispenser which can be pressed downwardly relative to the soil and, upon further downward movement, can be loaded with a measured charge of liquid which is forcibly dispensed upon or into the soil when the device is released to its normal position. Thus, a downward force which is not uniform may be applied to the device to load and cock it, whereupon a uniform and measured amount of liquid is forcibly ejected under a uniform pressure upon or into the ground, when the downward force is released. The piston of the pump assembly which is provided in the lower portion of the reservoir is movable to an upper position relative to the upper end of the pressure chamber with which it coacts, whereby fluid can flow from the reservoir and around the piston into the pressure chamber. The piston thereby additionally serves as a valve by which the fluid from the reservoir is admitted to the pressure chamber. This construction eliminates the multiplicity of check valves which have been employed in previous devices, thereby greatly simplifying the manufacturing and operation of the device to provide a liquid dispenser which is relatively inexpensive and trouble free.

It is therefore an object of the present invention to provide a lightweight, inexpensive liquid dispenser which is engaged with the soil in a downward motion, and which is charged with a measured quantity of liquid by a further downward movement, whereby this quantity of liquid is forcibly ejected with respect to the soil by releasing the downward pressure on the device to permit it to move upwardly under a spring bias.

Another object of the invention is to provide a liquid injector in which the piston of a pump assembly additionally serves as a valve whereby liquid from a reservoir portion can flow around the piston to be admitted into the pressure chamber of the pump.

Another object of the invention is to provide a liquid dispenser embodying a pump assembly in which yieldable means carried by a piston slidably engage a pressure chamber to forcibly eject liquid adjacent to a plant to which the liquid is to be administered.

A further object of the invention is to provide a liquid dispenser of the injector type, and having a curved soil engaging portion to permit insertion of a probe into the soil at a uniform depth even when it is inserted at various angles relative to the soil surface.

Figure 2:
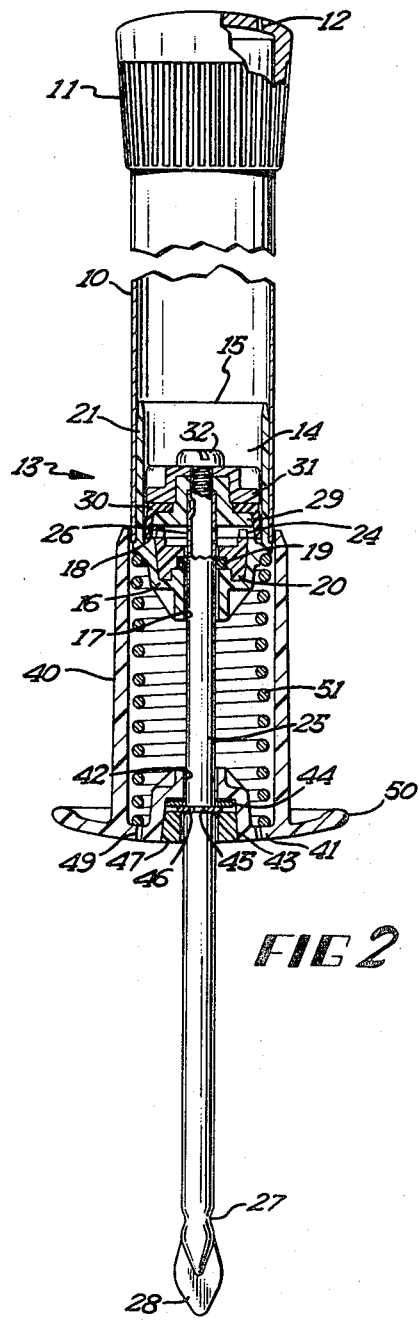
Figure 3:
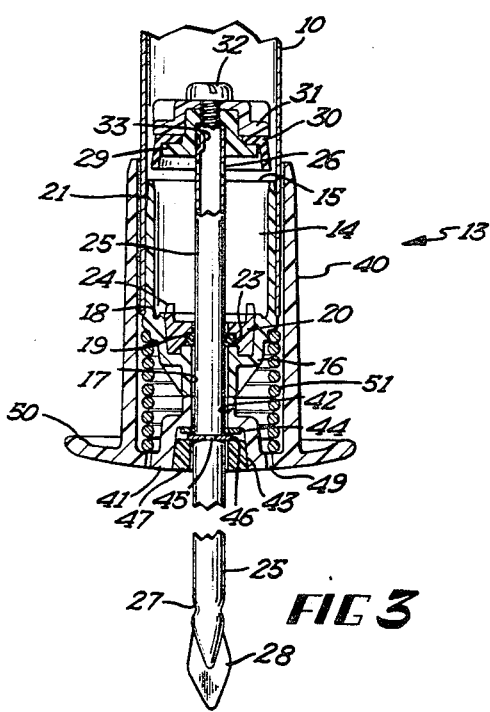

Other objects of the invention will become apparent from a consideration of the accompanying specification and claims, and from the drawing in which:

FIGURE 1 is a view in side elevation of my improved liquid dispenser, illustrating the operation of the device;

FIGURE 2 is a cross-sectional side view of my improved liquid dispenser with an intermediate portion thereof broken away for compactness of illustration, and with the liquid reservoir and pressure chamber in their relaxed or extended position relative to the soil engaging member; and FIGURE 3 is a view in section of a lower portion of the liquid dispenser, with the liquid reservoir and pressure chamber compressed relative to the soil engaging member.

Referring specifically to the drawing, my device comprises an elongated tubular reservoir 10 covered at its open upper end with a removable cup-shaped cap 11.

The tube 10, as will be explained, is normally filled with liquid introduced through the top by removal of the cap 11, and is preferably transparent so that the liquid level within the tube can readily be observed. The upper end of the cap 11 is formed with a passage 12, through which air may enter the reservoir 10.

A pump assembly, indicated in its entirety by general reference numeral 13, is mounted on the lower end of the tubular reservoir 10. A pressure chamber 14 of the pump assembly 13 has a cylindrical portion 21 secured within the interior walls of the tubular reservoir 10. An upper open end 15 of the cylindrical portion 21 of pressure chamber 14 is in communication with the reservoir 10. The lower end of the cylindrical chamber 14 is closed by a bottom wall 16 which has a cylindrical opening 17 therethrough, the bottom wall 16 being tapered generally downwardly to the opening 17 which is centrally located with respect to the pressure chamber 14. An upwardly facing annular groove 18 is provided in the upper surface of the bottom wall 16 at the base of the cylindrical portion 21 of the pressure chamber 14, as best shown in FIGURE 3.

The upper end of the opening 17 is surrounded by a resilient seal 19 which is held in position adjacent the upper opening of passage 17 by a seal retaining plug 20. The tapered bottom wall 16 is formed in the shape of a frusto-conical cup, and the seal retainer 20 is a plug of corresponding shape which is tightly fitted into the interior of the cup-shaped bottom wall 16 and bonded thereto. Because of the engaging tapered surfaces on the seal retainer and in the cup portion of the bottom wall 16, the seal retainer can readily be forced firmly into position as it is being bonded to the bottom wall 16. The seal retaining plug 20 is provided with a central opening having an upper portion of a diameter equal to that of the opening 17, and an enlarged lower portion which forms an annular groove 23 which surrounds the upper end of the opening 17, and confines the resilient seal 19 to hold the seal in a fixed position.

A multiplicity of spaced vertical tabs 24 extend from the upper surface of the retaining plug 20 to facilitate the insertion of the plug into the cup-shaped bottom wall 16, and serve additionally as stops which may engage the pump piston, as will be explained.

A tubular rod 25 extends through the opening 17 in the bottom wall 16 of the pressure chamber 14 in engagement with the resilient seal 19, and is vertically slidable through the opening 17. An upper portion of the tubular rod 25 extends into the pressure chamber 14 and is provided with inlet ports 26 in the walls thereof. Discharge ports 27 are provided in the lower end of the tube above a blade 28 formed at the lower extremity thereof.

A collar 29, formed with a central opening having a lower portion of a diameter corresponding to that of the tubular member 25, is tightly fitted over the upper end of tubular rod 25. The lower end of the collar 29 is formed with a peripheral flange which extends transversely from the tubular rod 25, and the extended edge of the peripheral flange is spaced inwardly from the cylindrical portion 21 of pressure chamber 14, as best seen in FIGURE 2.

An inverted cup-shaped gasket 30, of rubber or other suitable resilient material, has a central aperture through which the collar 29 extends. An upper portion of the gasket is disposed above the peripheral flange of collar 29, with the downwardly extending lips of the gasket surrounding the flange and designed to slidably engage the interior surface of the cylindrical portion 21 of chamber 14.

A gasket retaining collar 31 is formed with a lower cylindrical opening into which the upper end of collar 29 is fitted, and with a peripheral flange which coacts with the peripheral flange of collar 29 to clamp the gasket 30 therebetween. The upper portions of collars 29 and 31 are provided with centrally disposed apertures through which a screw 32 extends. The upper end of the tubular rod 25 is deformed inwardly to provide a rib 33 designed to tightly engage the screw 32, which is threaded into the interior of rod 25 to secure the collars 29 and 31 and the interposed gasket 30 to the upper end thereof, the entire assembly serving as a piston head adapted to slidably engage the interior surface of the cylindrical portion 21 of pressure chamber 14.

The reservoir 10 and the parts of the above described pump assembly 13 are preferably made of plastics to prevent deterioration of the parts by the corrosive chemicals with which they are often used.

A cylindrical sleeve 40 is circumposed about the pressure chamber 14 and a lower portion of the tubular reservoir 10 in slidable engagement with the latter. The lower end of the sleeve 40 is closed by a generally transversely disposed bottom wall 41, which is provided with a vertical central opening 42 through which the tubular rod 25 extends. A frustoconical opening 43 is provided in the lower side of the bottom wall 41, tapering upwardly toward the opening 42 about which it is concentrically disposed. The upper end of the opening 43 is of a diameter greater than that of the opening 42, and a flat washer 44 abuts the upper end of the opening 43 and surrounds the tubular rod 25.

An annular notch 45 is provided in the exterior surface of tubular rod 25, and is designed to receive a resilient split ring 46 which fits tightly into the notch 45 and extends laterally therefrom, abutting the lower surface of the washer 44 to prohibit upward movement of the tubular rod 25 relative to the cylinder 40.

A retaining plug 47 of a shape corresponding to the opening 43 is affixed within a lower portion thereof by a suitable bonding process and is provided with a central opening through which the tubular rod 25 extends. The engaging surfaces of plug 47 and opening 43 are tapered to facilitate assembly and bonding. The upper surface of the retaining plug 47 abuts the split ring 46, which extends laterally from the tubular rod 25 to prohibit downward displacement of the rod relative to the cylindrical sleeve 40. The sleeve 40 is thus rigidly affixed to the tubular rod 25 which extends therethrough. A multiplicity of drain passages 49 are provided in the bottom wall 41, and a lateral extension of the wall 41 forms an annular flange 50 which is curved upwardly from a plane perpendicular to the vertical axis of the cylindrical sleeve 40.

A coil spring 51 is circumposed about the tubular rod 25 within the cylindrical sleeve 40 between the bottom wall 16 of the pressure chamber 14 and the bottom wall 41 which closes the lower end of the cylinder 40. The spring 51 thus exerts an upward bias on the chamber 14 and reservoir 10 relative to the cylinder 40 and rigidly affixed tubular rod 25 to tend to displace them to the positions shown in FIGURE 2. An upward bias upon the pressure chamber is thus also exerted relative to the collars 29 and 31 and gasket 30 which are secured to the upper end of tubular rod 25.

The lower end of the reservoir 10 to which the pressure chamber 14 is affixed is slidably movable within the cylinder 40 and may be displaced downwardly relative thereto upon compression of the spring 51, as shown in FIGURE 3. As further illustrated in FIGURE 3, the pressure chamber 14 may be displaced downwardly to a point where further downward movement is prevented by contact between the lower extremity of the bottom wall 16 of the chamber 14 with the upper extremity of the bottom wall 41 which closes the lower end of cylinder 40. In this position, the upper open end 15 of the chamber 14 is spaced relative to the lower lip of the gasket 28, thereby forming an annular passage through which liquid from the reservoir 10 can enter the pressure chamber 14.

In operation, the cap 11 is removed from the upper end of the reservoir 10, and a tablet formed of a water soluble plant fertilizer is dropped into the reservoir. Water is then admitted into the reservoir to dissolve the tablet and form a liquid fertilizer. A pre-mixed fertilizer or other liquid, such as a herbicide, or pesticide, of course, could also be used. After the reservoir has been filled and the cap 11 replaced, the lower end of the tubular rod 25 is inserted into the soil in proximity to the roots of a plant to which the liquid is to be administered, as is illustrated in FIGURE 1, the rounded cap serving as a handle by which the dispenser is grasped. The tubular rod 25 is pressed into the soil until the bottom wall 41 and its curved lateral extension 50 engage the surface, as shown in FIGURE 1. To facilitate insertion of the tubular rod 25 into the soil, pressure may be applied by the foot of the user to the upper surface of the curved lateral extension 50. The lateral edges of the blade 28 form grooves in the soil, or at least loosen it, adjacent to the discharge ports 27 to prevent blockage of the ports. Since the lateral extension 50 of the bottom wall 41 is curved upwardly, the rod 25 may be inserted to a substantially uniform depth at various angles of insertion.

A further downward force is exerted by the user at the upper end of the elongated tubular reservoir to compress the spring 51 and displace the pressure chamber 14 downwardly relative to the collars 29 and 31 and interposed gasket 30, as shown in FIGURE 3. The annular space between the open end 15 of the pressure chamber 14 and the lip of the gasket 30 serves as a passage between the reservoir 10 and the chamber 14, to fill the chamber with liquid. As the liquid flows into the pressure chamber from the reservoir, it is displaced in the reservoir by air which is admitted through the passage 12 in the cap 11.

When the downward force on the upper end of the tubular reservoir 10 is released, the spring 51 expands, forcing the pressure chamber 14 and reservoir 10 upwardly. As the open end of the chamber is displaced upwardly, the lateral extremities of the gasket 30 yieldably engage the interior walls of the cylindrical portion 21 of chamber 14, thereby closing the annular passage and forming a substantial seal between the chamber 14 and reservoir 10. It will be noted that the upper end of the interior of the cylindrical portion 21 of chamber 14 is tapered outwardly. This facilitates entry of the gasket 30 into the cylindrical portion 21 and also provides for admission of fluid during a greater portion of the upward movement of gasket 30.

As the chamber 14 is further displaced upwardly relative to the piston assembly, the liquid therein is forced through the inlet ports 26 in the upper end of the tubular rod 25, down through the rod, and is forceably ejected from the discharge ports 27 into the soil. Further upward displacement of the chamber 14 is prevented by contact of the bottom wall of the chamber with the lip of gasket 30 as shown in FIGURE 2, and the annular groove 18 is engaged by the lip to substantially seal the lower end of the reservoir 10. While the tabs 24 normally do not engage the under wall of collar 29, they may engage the wall to limit the relative movement of chamber 14 and cylinder 40, if gasket 30 becomes sufficiently worn.

The pressure chamber seal 30 and the resilient seal 19 prevent leakage of liquid into the cylinder 40, but should any such leakage occur, the liquid may escape through the drain passages 49. The passages 49 further provide a means for releasing any air pressure which is created in the cylinder 40 upon downward displacement of the chamber 14.

It may thus be seen that I provide an improved liquid dispenser which is considerably simplified in construction, and which effectively ejects a measured quantity of liquid into the soil under a substantial and uniform force. I further provide a liquid dispenser in which the piston member of the discharge pump additionally serves as a valve between the reservoir and the pressure chamber of the pump, thereby eliminating a complex multiplicity of check valves.

In the embodiment of my invention herein disclosed, fluid is discharged through the tubular member 25 and is injected into the soil. It will be apparent that while my apparatus is particularly designed for injecting liquid beneath the soil surface, the soil penetrating blade 28 could in some cases be replaced by a soil engaging foot, thereby adapting the dispenser to discharge liquid onto the soil surface rather than injecting it below the surface. Likewise, the rod 25 could be solid rather than tubular, and discharge ports could be provided in the pressure chamber itself, to discharge liquid onto the soil surface. Therefore, while I have shown a specific embodiment of my invention, it is to be understood that this is for the purpose of illustration only, and that the scope of my invention is limited solely by the appended claims.

I claim as my invention:

1. A liquid dispenser for dispensing liquids, such as weed exterminators, plant foods and the like, with respect to the ground comprising:

a first member having a liquid reservoir formed therein;

a second member connected with the first member, the second member having a cylindrical pressure chamber formed therein, which has a wall extending across a first end thereof and which has its other end in communication with said reservoir;

piston means normally positioned in said chamber, the piston means and the second member being movable relative to each other between a first position wherein said piston means is adjacent said first end of said chamber and a second position wherein the piston means is adjacent said other end of said chamber so that the liquid in the reservoir may flow from said reservoir into the portion of said chamber between the piston means and said first end thereof;

piston positioning means, including a ground contacting portion, for causing relative movement of the second member and piston means from said first position to said second position;

biasing means for biasing the second member and piston means from said second position to said first position; and passage means communicating with said chamber for permitting the liquid in said portion of said chamber to be dispensed from the chamber as the second member and piston means are moved from said second position to said first position by the second means.

2. The liquid dispenser described in claim 1 wherein the wall of the second member has a central aperture formed therein which has a cross-sectional area smaller than the cross-sectional area of said chamber; wherein the piston positioning means includes a rod slidably positioned within said aperture and having one end thereof connected with the piston means and having the other end extending from the second member and terminating in the ground contacting portion.

3. The liquid dispenser described in claim 2 wherein said passage means comprises a tubular passage through said rod and wherein the rod has at least one inlet port formed therein adjacent its one end and at least one discharge port formed therein adjacent its other end so that liquid may flow from said portion of said chamber into, through and out of said rod.

4. The liquid dispenser described in claim 2 wherein the second member is mounted within the lower end of the first member; wherein a base member, having an open upper end, is connected to the rod, between its ends, and is positioned so that the second member and the lower end of the first member extend into the base member and may be moved relatively thereto; wherein the lower end of the base member also has a ground contacting portion, and wherein the biasing means is a coil spring positioned between the lower end of the base member and the second member.

5. The liquid dispenser described in claim 4 wherein the other end of the rod is a probe which is adapted to be inserted into the ground to inject liquid therein.

6. The liquid dispenser described in claim 5 wherein said probe is formed with a blade at the lower end thereof below and in line with said discharge port, the lateral edge of said blade being adapted to cut a groove in the soil into which said probe is inserted, said groove being formed adjacent to said discharge port to enable the liquid being discharged from said discharge port to flow into said groove.

7. The liquid dispenser described in claim 4 wherein the lower end of the base member is formed with an upwardly curved, laterally extending portion, said curved portion being adapted to engage the ground surface at various angles when said probe is inserted therein.

8. The liquid dispenser described in claim 1 wherein the piston means has such a configuration with respect to the first member that when it is in the second position, it extends out of said chamber, beyond the upper end of the second member and into said reservoir thereby permitting liquid in said reservoir to flow around said piston means and into said portion of said chamber.

9. The liquid dispenser described in claim 1 wherein the piston means includes a seal which contacts the side wall of the second member which defines said chamber while the piston means and second member are in said first position and while they approach and move away from said second position.

References Cited

UNITED STATES PATENTS

| | | | |
|---|---|---|---|
| 1,890,301 | 12/1932 | Oakes | 111—7.3 XR |
| 2,222,235 | 11/1940 | Nelson | 111—7.3 |
| 2,817,189 | 12/1957 | Esmay | 111—7.3 |
| 2,874,658 | 2/1959 | Jarnette et al. | 111—7.3 |
| 2,885,121 | 5/1959 | Littleton | 111—7.3 XR |
| 3,346,194 | 10/1967 | Enblom | 47—1 XR |

ROBERT E. BAGWILL, *Primary Examiner.*